Jan. 3, 1928.
V. DANIELS
CULTIVATOR BLADE
Filed June 21, 1926
1,654,681
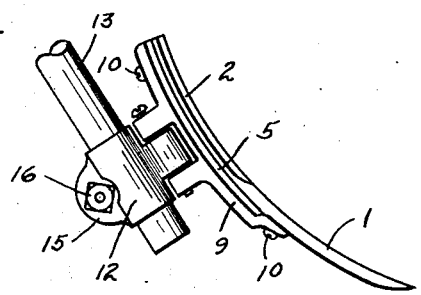
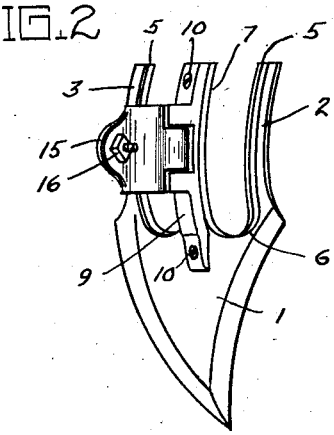
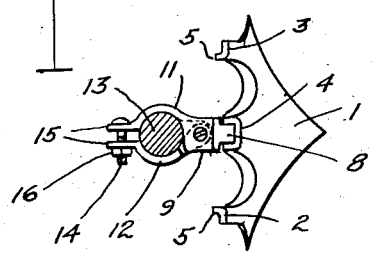
INVENTOR.
Valentine Daniels,
BY Walter N. Haskell,
his ATTORNEY.

Patented Jan. 3, 1928.

1,654,681

UNITED STATES PATENT OFFICE.

VALENTINE DANIELS, OF ERIE, ILLINOIS.

CULTIVATOR BLADE.

Application filed June 21, 1926. Serial No. 117,311.

My invention has reference to a cultivator shovel, and seeks to improve on a similar device on which Letters Patent of the United States numbered 1,267,518 were issued to myself May 28, 1918. The present invention is of the same type of shovel, wherein the upper part of the blade is cut away to form spaced parallel prongs, said prongs having rearwardly extending flanges which form reinforcements therefor. One of the features of the present invention consists in extending the flanges entirely around the openings between the prongs and rounding the angles formed between the prongs and flanges so that there will be a minimum of resistance to the passage of the earth between such prongs.

Another purpose of the invention is to increase the efficiency and durability thereof by securing to the rear face thereof a support or bracket provided with a rib which is seated in the channel formed by the flanges on the middle prong. Said support is also provided with a socket capable of adjustment, so that the same will conform readily to cultivator shanks of varying sizes.

The above named, and other features and advantages of the invention will more fully appear from the following specification, taken in connection with the accompanying drawings, in which:

Fig. 1 shows the invention in side elevation, as it appears when attached to a cultivator shank.

Fig. 2 is rear elevation thereof, partly in perspective.

Fig. 3 is a top plan view thereof.

The reference number 1 indicates the blade of a cultivator shovel, projected upwardly into a pair of outer prongs 2 and 3, and a central prong 4. The inner edges of the prongs 2 and 3 are provided with flanges 5, which are extended downwardly along the inner ends of the openings between the prongs, as at 6, and then upwardly along the edges of the prong 4 at 7. These flanges may be formed from a part of the metal removed from the openings, as mentioned in said former patent, and the edges are curved or rolled, as above mentioned.

The flanges on the prong 4 form a channel to receive a rib 8 on a support 9 extending longitudinally of said prong, and attached to the shovel by screws 10, riveted at their forward ends. The support 9 is provided with a socket formed of a fixed section 11 and hinged section 12, adapted for attachment to the end of a cultivator shank, as indicated at 13. The socket sections are clamped to the shank by means of a bolt 14, passing through extensions 15 on said sections, and fitted with a nut 16.

When the cultivator shovel is passing through the earth in its usual inclination, as portrayed in Fig. 1, the dirt will run smoothly round the edges of the prongs, as over a plow share, without danger of clogging, and with a tendency to keep the prongs well scoured. The attachment of the support and engagement thereof with the center prong is such as to preclude any possibility of the parts twisting or turning with relation to each other, and the maximum of strength and permanence is secured.

It will be obvious that the socket sections can be made to adapt themselves readily to shanks of different diameters.

What I claim, and desire to secure by Letters Patent, is:

1. In a device of the class described, a blade formed upwardly into spaced prongs, the middle prong being provided with flanges disposed rearwardly and forming a channel, and a support adapted for attachment to a cultivator part, and provided with a rib fitting into said channel.

2. In a device of the class described, a blade formed upwardly into spaced prongs, the middle prong of which is provided on its rear face with a longitudinal channel, a support adapted for attachment to said blade, and provided with a rib fitting into said channel, and a socket member connected with said support, comprising a fixed section and section hinged thereto, and means for holding said sections in clamped relation on a cultivator shank.

In testimony whereof I affix my signature.

VALENTINE DANIELS.